INVENTORS:
FRITZ K. FLEISCHER
BILLY W. SISK
BY: *Joseph L. Strabala*
THEIR ATTORNEY INVENTORS:
FRITZ K. FLEISCHER
BILLY W. SISK
BY: Joseph L. Strabala
THEIR ATTORNEY United States Patent Office 3,346,915
Patented Oct. 17, 1967

3,346,915
PRILLING NOZZLE
Fritz K. Fleischer, Ventura, and Billy W. Sisk, Ojai, Calif., assignors to Shell Oil Company, New York, N.Y., a corporation of Delaware
Filed Nov. 25, 1964, Ser. No. 413,854
4 Claims. (Cl. 18—2.7)

ABSTRACT OF THE DISCLOSURE

A prilling nozzle for producing small liquid droplets of molten material that solidify into uniform prills upon cooling. The nozzle consists of two vertically spaced horizontal plates that are provided with closure means at their margins to form a heating chest. A plurality of small diameter tubes extend vertically through the chest and are sealed to the spaced plates. Means are provided for circulating a heating medium through the chest to maintain the material molten as it flows through the small-diameter tubes.

---

The invention relates to prilling nozzles, which produce small liquid droplets from molten material, such as molten urea and ammonium nitrate, which solidify into uniform prills upon cooling.

Prills can be formed by discharging molten materials, which solidify as they are cooled, from nozzles in various ways, such as spraying the molten material from nozzles into a cooling atmosphere, or alternatively, into a cooling liquid. In the past, nozzles used have had the disadvantage of producing a wide distribution of particle sizes, and substantial amounts of undesirable fine prills.

Prills can also be formed by raining molten liquefied material from a perforated plate into a cooling atmosphere, e.g., in the form of a prilling tower, to effect the break-up of the molten material into liquid droplets which solidify while falling through the cool atmosphere. A drawback of this technique has been that many such molten liquids, such as urea, tend to spread out on the undersurface of the perforated plate and form larger drops rather than the uniform smaller drops desired; also there is a tendency to form stalactite-like accumulations from the bottom of the plate because of freezing of the molten liquid below the plate. Thus, large drops falling from the nozzle plate or from the stalactite-like accumulations often fail to freeze before reaching the bottom of the prilling tower and splatter upon impact at the bottom of the tower. This splattered material not only results in prills which must be screened out and recycled, but it also tends to fuse and agglomerate otherwise acceptable prills to the extent that they also must be screened out and recycled. Such screening and recycling are not only expensive in terms of the capacity of the equipment and energy consumption, but the recycling of the material often causes an undesirable build-up of impurities in the final product.

In order to form the desired size range of droplets, minimizing fines, and also minimizing large drops which splatter, small-diameter tubes have been mounted in the nozzle plate to project downwardly from the plate. Although this innovation tended to improve results and eliminate some of the larger drops, prills of uniform size were not always obtainable, since these small-diameter tubes were subject to rapid and uncontrolled cooling because of random air drafts in the tower; this was especially severe when the flow of the molten material became restricted, allowing the molten material to freeze on and in the end of the tubes. Further cooling resulted because of the restricted flow and led to freezing of the molten material and complete stoppage of the passages in the tubes. The tubes could be cleared or freezing avoided by heating the molten material at a higher temperature—an expedient which is often undesirable, since higher temperatures lead to chemical reactions, e.g., the formation of decomposition or polymerization products, and prevent the drops from freezing prior to reaching the collection area without additional cooling. Thus, elevated temperatures accelerate the formation of undesirable byproducts, such as urea polymers and degradation products.

The aforementioned difficulties are avoided by a prilling nozzle construction according to the invention which flows a heating medium, such as steam, about the small diameter tubes having a small internal bore to keep the temperature substantially uniform along their entire length, so the flow of molten material will not freeze in the bores of the tubes. To this end tubes are provided that project downwardly beneath the nozzle plate and extend through a heating chest, usually a steam chest, through which a heating medium is circulated to supply heat to the tubes continuously. By this arrangement uneven cooling of the downwardly projecting portion of the tubes due to random air currents and/or the cessation of flow of the fluid material is significantly reduced or eliminated.

The above-mentioned chest in effect forms a thickened, composite nozzle plate having spaced upper and lower walls, and the molten material to be prilled is supplied to the upper plate through suitable conduit means and passes through the small diameter heated tubes, emerging in fine stream at their bottom ends projecting from underside of the lower wall of the chest. The conduit is preferably a duct having a jacket through which a heating medium also is flowed to maintain the material in the molten state.

It was found that the axial bores through the small diameter tubes are, in most applications, so small that it is difficult to weld the tubes to the upper and lower walls of the heating chest. For example, the tubes are often of diameters of hypodermic dimensions, e.g., bores of 0.010 to 0.100 inch, in accordance with the desired small size. If such a small tube is welded to the walls of the chest, it is subject to damage, while a simple press fit leads to joints that are not steam-tight and some of the heating medium leaks through into the molten material above the upper wall. To overcome this difficulty it was found to be desirable to provide aligned larger holes in the upper and lower walls of the steam chest and weld a sleeve or larger size tube to the walls in these holes, and press-fit into the sleeve the tube with the fine bore.

The tube with the fine bore may be made of any material, such as stainless steel, determined largely upon the nature of the molten material to be passed therethrough.

The invention will be further described with reference to the accompanying drawing showing one preferred embodiment of the invention, wherein.

Figure 1:
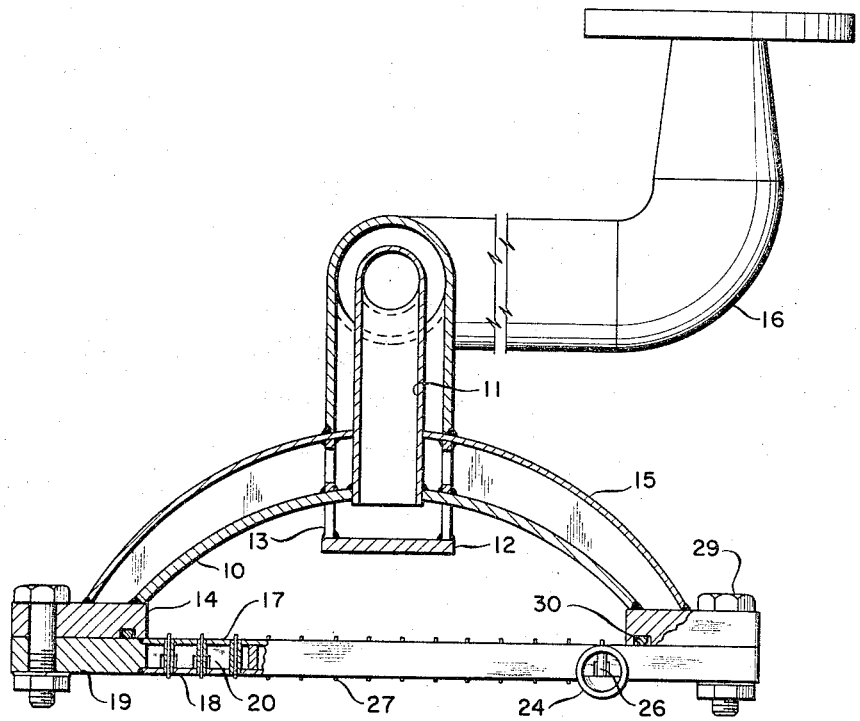
FIGURE 1 is an end elevation of the nozzle and supply conduit, partly in section to show internal detail.
Figure 2:
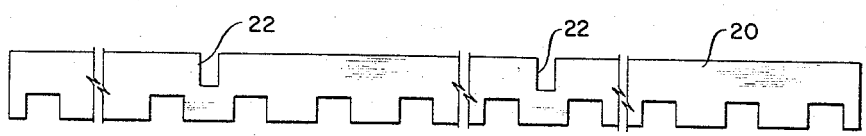
FIGURES 2 and 3 are side elevations of parts of the longitudinal and transverse internal reinforcing bars for the heating chest.
Figure 3:
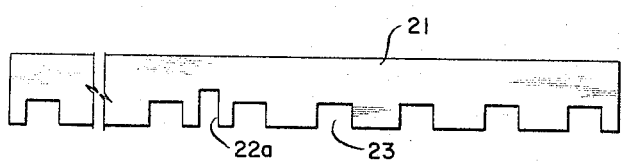
Figure 4:
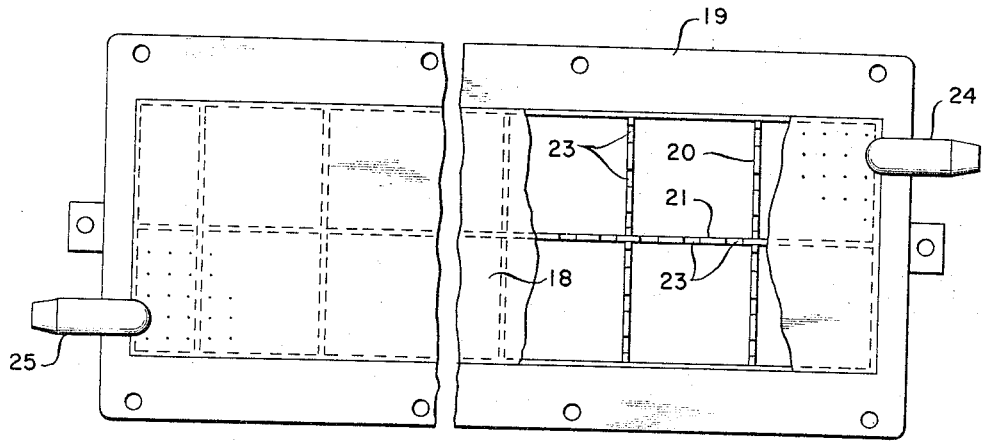
FIGURE 4 is a bottom plan view of the nozzle, parts being broken away.
Figure 5:
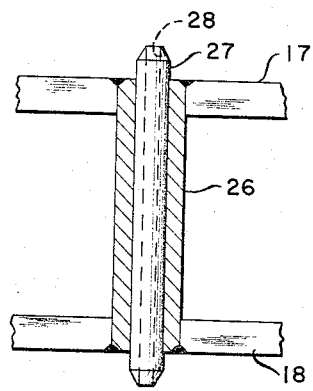
FIGURE 5 is an enlarged detail view of the small diameter tube which extends between the upper and lower walls of the chest.

Referring to the drawings in detail, the prilling nozzle proper includes a supply chamber 10 having a molten material inlet duct 11 and containing an impingement plate 12 mounted opposite to the inlet by stirrups 13. The nozzle terminates in a rectangular frame 14 having a flat lower face with a plurality of tubes projecting vertical from the face. A jacket 15 for the flow of a heating medium surrounds the chamber 10 to keep the material in the chamber in the molten state. The molten material is supplied to the duct 11 from a jacketed conduit 16 which has a heating medium circulated through the jacket to keep the molten material from freezing in the supply conduit.

The bottom of the nozzle chamber 10 is closed by a chest which is comprised of flat upper and lower walls 17 and 18 and marginal spacerclosures 19 welded to the edges of the walls. The upper and lower walls 17 and 18 are retained in spaced relation by longitudinal and transverse reinforcing bars 20 and 21, which have notches 22 and 22a to permit interlocking, forming an egg-crate-like packing structure. Each reinforcing bar has a plurality of other notches 23 formed adjacently to the lower wall 18 to permit heated fluid to flow freely between the sections formed by the interlocked reinforcing bars 20 and 21 which may be welded directly to walls 17 and 18. An inlet 24 for heating fluid is provided at one end of the chest and an outlet 25 for spent heating fluid, which may be or contain condensate, is provided at the other end.

Sleeves 26 extending vertically through upper and lower walls are fixed at their ends, e.g., by welding, to the walls 17 and 18, which have vertically aligned holes of size to receive these sleeves in a close fitting relationship. Welding continuously around these sleeves at their intersection with upper and lower walls 17 and 18 makes the chest steam-tight. After the sleeves are secured in the walls, smaller tubes 27, having fine axial passages 28, are pressed into sleeves 26 sufficiently to project downwardly beneath the lower wall 18 and the ends of sleeves 26; they may also project upwards above the upper wall 17 and the upper ends of sleeves 26 as shown.

The chest is secured to the frame 17 by means of bolts 29 and sealed thereto by gaskets 30 which prevents the leakage of molten material from the bottom chamber 10.

When used, for example, to produce urea prills, molten urea at a temperature of 270° to 310° F. is supplied through the duct 11 and steam or any other suitable heating fluid is flowed through the inlet 24 and through the chest at a temperature of about 290° F. The molten urea flows through the fine bores 28 in the tubes 27 and emerges at the lower ends of tubes 27 as fine streams which spray down through a cooling medium, such as cool air, in a prilling tower. In falling the streams break up into small uniform droplets which freeze before falling onto a collection area, such as a conveyor belt, at the bottom of the tower. The passage of the heating fluid through the steam chest prevents the small diameter tubes from being cooled and maintains them at a constant preselected temperature along their entire length ensuring more uniform prills.

Use of urea in prilling nozzles is merely illustrative of the operation of our prilling nozzle and one skilled in the art could apply the proper temperature ranges for prilling many other materials.

We claim as our invention:

1. A prilling nozzle for producing small liquid droplets of molten material which solidify into uniform prills upon cooling comprising:
    (a) a heating chest including a pair of opposed, vertically spaced horizontal walls, closure means for the margins of the chest, and means for flowing a fluid heating medium through said chest;
    (b) a plurality of small-diameter tubes having a small internal bore extending vertically through said chest and sealed in vertically aligned pairs of holes in said horizontal walls preventing the escape of heating medium from said chest, said tubes projecting downwardly beyond the lower wall; and
    (c) a chamber above the upper wall of said chest having its bottom closed by the exterior of said upper wall of said chest to supply molten material to the top of said tubes which can pass downwardly through said bore of said small diameter tubes for prilling.

2. A prilling nozzle as defined in claim 1 in which each of said small-diameter tubes consists of a sleeve extending between each said pair of vertically aligned holes and fixedly sealed to said respective walls to prevent the escape of heated fluids from said chest and a separate small diameter tube disposed within the internal bore of each of said sleeves.

3. A nozzle as defined in claim 1 wherein the horizontal walls are parallel and of extended area and the chest formed therebetween includes reinforcing bars extending between said walls, said bars being in contact with said walls and having passages for the flow of said heating medium throughout said chest.

4. A prilling nozzle for producing small liquid droplets of molten material which solidify into uniform prills upon cooling comprising:
    (a) a heating chest including a pair of parallel, horizontal, flat upstream and downstream plates of extended area spaced vertically apart in registered relationship by a distance small in relation to the width thereof, walls closing the margins of said plates to form said chest, a heating-medium inlet and an outlet communicating with the inside of said chest for the passage of a heating medium therethrough;
    (b) a plurality of sleeves vertically extending through said chest and sealed adjacent to their ends to said plates in vertical aligned holes formed in said plates;
    (c) a tube having a fine axial bore fixedly disposed within each said sleeve and projecting vertically below both said downstream plate and said sleeves; and
    (d) a chamber closed at the bottom by said upstream plate for supplying said molten material in liquid form to said upstream plate for flow through said axial bores of said tubes.

References Cited

UNITED STATES PATENTS

| 419,915 | 1/1890 | Bingham | 18—29 |
| 2,110,570 | 3/1938 | Eichengrun. | |
| 2,268,888 | 1/1942 | Mericola | 18—2.7 X |
| 2,528,407 | 10/1950 | Yeandle | 18—2.7 X |
| 2,735,138 | 2/1956 | Luehm et al. | 18—39 X |
| 2,872,706 | 2/1959 | Jordan | 18—39 |
| 3,023,171 | 2/1962 | Smith | 18—2.7 X |

WILLIAM J. STEPHENSON, *Primary Examiner.*